(12) United States Patent
Kamiya

(10) Patent No.: US 9,418,287 B2
(45) Date of Patent: Aug. 16, 2016

(54) OBJECT DETECTION APPARATUS

(71) Applicant: DENSO CORPORATION, Kariya, Aichi-pref. (JP)

(72) Inventor: Yasunori Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 162 days.

(21) Appl. No.: 14/204,152

(22) Filed: Mar. 11, 2014

(65) Prior Publication Data

US 2014/0270548 A1   Sep. 18, 2014

(30) Foreign Application Priority Data

Mar. 13, 2013   (JP) ................. 2013-050632

(51) Int. Cl.
*G06K 9/00* (2006.01)
*H04N 5/225* (2006.01)
*H04N 7/00* (2011.01)
*G06K 9/62* (2006.01)

(52) U.S. Cl.
CPC ........ *G06K 9/00536* (2013.01); *G06K 9/00791* (2013.01); *G06K 9/6227* (2013.01); *G06K 9/6262* (2013.01)

(58) Field of Classification Search
None
See application file for complete search history.

(56) References Cited

U.S. PATENT DOCUMENTS

| | | | | |
|---|---|---|---|---|
| 2003/0044067 A1* | 3/2003 | Huang | ............... | G06K 9/00221 382/181 |
| 2010/0316298 A1* | 12/2010 | Swaminathan | ........ | G06K 9/621 382/209 |
| 2012/0224743 A1* | 9/2012 | Rodriguez | .............. | G06T 11/60 382/103 |
| 2012/0296567 A1* | 11/2012 | Breed | .................... | G01C 21/26 701/468 |
| 2013/0108115 A1* | 5/2013 | Hwang | .................. | G06K 9/033 382/106 |
| 2014/0079297 A1* | 3/2014 | Tadayon | .................. | G06K 9/00 382/118 |
| 2015/0071490 A1* | 3/2015 | Fukata | ............... | G06K 9/00791 382/103 |
| 2015/0078667 A1* | 3/2015 | Yun | ....................... | G06K 9/6201 382/195 |

FOREIGN PATENT DOCUMENTS

| | | |
|---|---|---|
| JP | 2005-259031 | 9/2005 |
| JP | 2006-163726 | 6/2006 |
| JP | 2007-249841 | 9/2007 |
| JP | 2007-328630 | 12/2007 |
| JP | 2009-237897 | 10/2009 |
| JP | 2009-295112 | 12/2009 |
| JP | 2010-079716 | 4/2010 |

* cited by examiner

*Primary Examiner* — Randolph I Chu
(74) *Attorney, Agent, or Firm* — Harness, Dickey & Pierce, P.L.C.

(57) ABSTRACT

An object detection apparatus mounted in a system for detecting a target object in various changing environmental conditions. In the apparatus, an acquirer acquires either or both of information indicative of an external environment around the system and information indicative of an operating state of the system. A determiner determines an environmental condition with respect to an input image according to the acquired information. A setter sets, for each of plural image recognition methods each being a combination of one of the plural image recognition dictionaries and one of the plural image recognition techniques, a weighting factor according to the environmental condition determined by the determiner. A detector detects the object in the input image by applying each of the plural image recognition methods to the input image to obtain recognition results reflecting the weighting factors, and collectively evaluating the recognition results.

10 Claims, 3 Drawing Sheets

FIG.2A

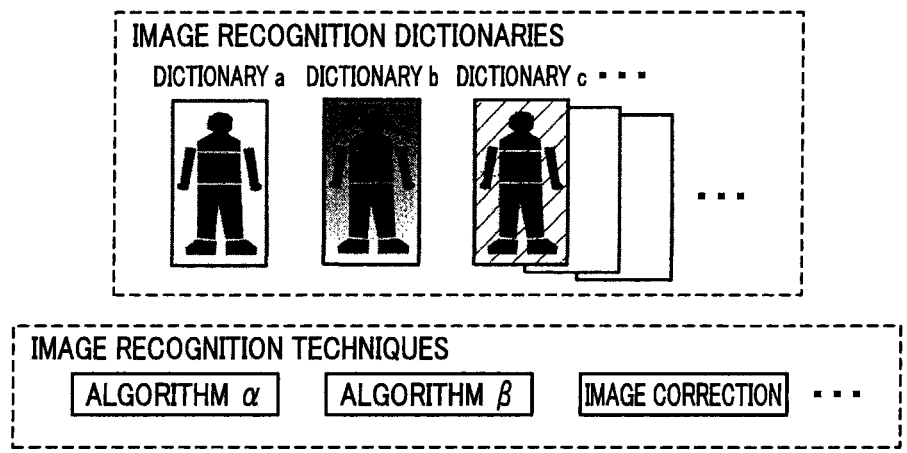

FIG.2B

PATTERN A= DICTIONARY a + ALGORITHM α
PATTERN B= DICTIONARY b + ALGORITHM α
PATTERN C= DICTIONARY c + ALGORITHM α
PATTERN D= DICTIONARY a + ALGORITHM β
PATTERN E= DICTIONARY b + ALGORITHM β
PATTERN F= DICTIONARY c + ALGORITHM β
PATTERN G= DICTIONARY a + ALGORITHM α + IMAGE CORRECTION
PATTERN H= DICTIONARY b + ALGORITHM α + IMAGE CORRECTION
PATTERN I= DICTIONARY c + ALGORITHM α + IMAGE CORRECTION
PATTERN J= DICTIONARY a + ALGORITHM β + IMAGE CORRECTION
PATTERN K= DICTIONARY b + ALGORITHM β + IMAGE CORRECTION
PATTERN L= DICTIONARY c + ALGORITHM β + IMAGE CORRECTION

⋮

OBJECT DETECTION APPARATUS

CROSS-REFERENCE TO RELATED APPLICATION

This application is based on and claims the benefit of priority from earlier Japanese Patent Application No. 2013-50632 filed Mar. 13, 2013, the description of which is incorporated herein by reference.

BACKGROUND

1. Technical Field

The present invention relates to an object detection apparatus for detecting a target object from an input image by using an image recognition dictionary.

2. Related Art

A known object detection apparatus for detecting a target object that is an object to be detected, such as a person or a vehicle present forward or rearward of a subject vehicle, applies an image recognition algorithm using a recognition dictionary describing reference data for the target object to an image captured by and received from a camera or the like. For example, an object detection apparatus as disclosed in Japanese Patent Application Laid-Open Publication No. 2010-79716 recognizes the presence of a pedestrian by matching the captured image with template data (referred to as an image recognition dictionary) for detecting the pedestrian.

The image recognition dictionary used in the image recognition of the target object is predefined for a specific assumed environmental condition. However, if an environmental condition when the image was captured is far different from the environmental condition assumed when the image recognition dictionary was predefined, robustness of the image recognition results obtained by using the image recognition dictionary will be reduced and thus performance of detecting the target object will be lowered.

The environmental conditions that may cause variations in the detection performance includes, but are not limited to, sunshine conditions (brightness), weather conditions (precipitation), daytime and nighttime hours, backdrop attributes (an urban area, a suburban area, a mountain area etc.), and active and inactive states of lighting devices or wipers. Hence stable performance of detecting the target object may not be achieved even when the image recognition processing that uses the image recognition dictionary and the image recognition technique predefined for the specific assumed environmental condition is applied to the images captured in various changing environmental conditions ambient to the target object.

In consideration of the foregoing, it would therefore be desirable to have an object detection apparatus that is capable of reliably detecting a target object in an input image even in various changing environmental conditions ambient to the target object.

SUMMARY

In accordance with an exemplary embodiment of the present invention, there is provided an object detection apparatus mounted in a system. The apparatus includes a storage storing plural image recognition dictionaries each describing reference data for an object to be detected and plural image recognition techniques each used to detect the object from an input image captured by an imaging unit with use of one of the plural image recognition dictionaries. In the apparatus, an acquirer acquires either or both of information indicative of an external environment around the system and information indicative of an operating state of the system. A determiner determines an environmental condition with respect to the input image according to the information acquired from the acquirer. A setter sets, for each of plural image recognition methods predefined for respectively different assumed environmental conditions, a weighting factor according to the environmental condition determined by the determiner, where each image recognition method is a combination of one of the plural image recognition dictionaries and one of the plural image recognition techniques. A detector detects the object in the input image by applying each of the plural image recognition methods to the input image to obtain image recognition results reflecting the weighting factors set by the setter for the respective image recognition methods, and then collectively evaluating the image recognition results.

With this configuration, the image recognition of the target object in the input image is performed with use of the plural image recognition methods each defined by a combination of one of the plural image recognition dictionaries and one of the plural image recognition techniques. The weighting factors set for the respective image recognition methods are changed with various environmental conditions. For example, when the information indicative of evening hours or rainy weather is acquired as an external environmental condition, a relatively higher weighting factor is assigned to the image recognition method that can provide high detection performance for such an external environmental condition, which leads to an increased contribution of this image recognition method to the final result obtained by collectively evaluating the recognition results of the respective image recognition methods, and thus leads to an increased recognition rate for the target object. This can achieve higher robustness of the image recognition for various changing environmental conditions around the target object, and can achieve higher performance of detecting the target object.

BRIEF DESCRIPTION OF THE DRAWINGS

In the accompanying drawings:

FIG. 2A shows an example of plural image recognition dictionaries and plural image recognition techniques;

FIG. 2B shows an example of plural image recognition methods; and

DESCRIPTION OF SPECIFIC EMBODIMENTS

The present invention will be described more fully hereinafter with reference to the accompanying drawings.

[System Configuration]

Figure 1A:
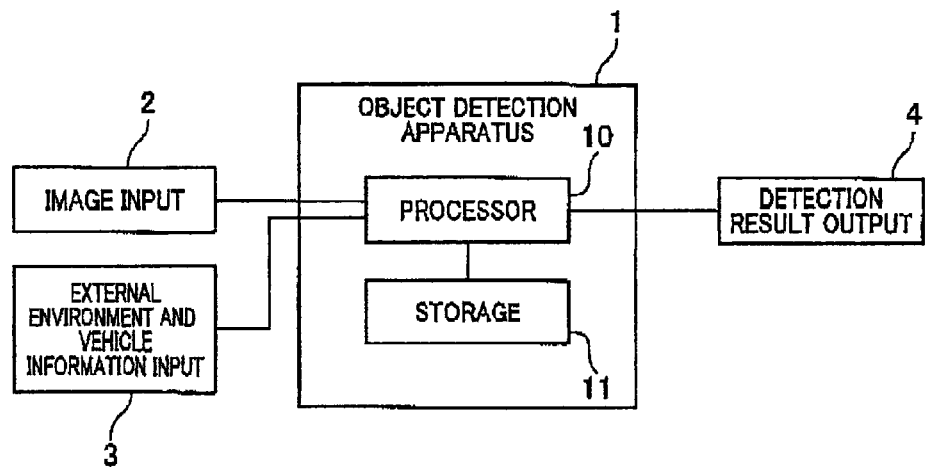
FIG. 1A shows a block diagram of an object detection system in accordance with one embodiment of the present invention.

An object detection system in accordance with one embodiment of the present invention is mounted in a vehicle (hereinafter referred to as a subject vehicle) and is used to detect a specific target object, such as a person, a vehicle (other than the subject vehicle), a road sign or the like present forward of the subject vehicle. As shown in FIG. 1, the object detection system includes an object detection apparatus 1, to which an image input 2, an external-environment and vehicle information input 3, a detection result output 4 and others are communicably connected.

The object detection apparatus 1 includes a processor 10 and a storage 11. The object detection apparatus 1 is configured to detect a target object image from an input image by applying image recognition processing to the input image with use of an image recognition dictionary describing the target object.

The processor 10 is an information processor including a central processing unit (CPU), a read-only memory (ROM), a random access memory (RAM), and an input/output interface and others (not shown). The processor 10 processes an input image from the image input 2 to detect a target object and outputs a detection result. The processor 10 applies well-known image recognition processing with use of an image recognition dictionary for a target object to the input image to detect a target object image therein. In the image recognition processing applied to the input image in accordance with the present embodiment, the processor 10 applies the image recognition processing to the input image with use of plural image recognition methods each formed of a combination of one of predefined plural image recognition dictionaries and one of predefined plural image recognition techniques, where the plural image recognition methods are assigned their respective weights according to environmental conditions determined by external environments and operating states of the subject vehicle. A target object recognition process of the present embodiment will be described later in more detail.

The storage 11 stores image recognition dictionaries describing reference data for a target object or target objects and computer programs associated with image recognition techniques (algorithms and image correction) with use of the image recognition dictionaries and others. In the present embodiment, plural image recognition dictionaries predefined for different assumed environmental conditions for the same target object are stored in the storage 11. These image recognition dictionaries are differentiated in image brightness, contrast, color, sharpness and the like according to various changing environmental conditions caused by external environments, such as weather, times of day, brightness, backdrop attributes, and operating states of the subject vehicle, such as on and off states (or active and inactive states) of vehicle headlights, wiper and the like of the subject vehicle. The storage 11 may store image recognition dictionaries for a pedestrian opening an umbrella, which describe reference data for the pedestrian in rainy weather or strong sunshine.

The plural image recognition techniques stored in the storage 11 include their respective image recognition algorithms different in recognition mechanism from each other, such as an image recognition algorithm based on similarity in geometry information between one of the image recognition dictionaries and the input image and an image recognition algorithm based on similarity in average or histogram of pixel values between one of the image recognition dictionaries and the input image. Each of the image recognition techniques may further include image correction to increase an image recognition detection rate of the image recognition algorithm, in which at least one of the brightness, contrast, color, sharpness and the like of the input image is adjusted prior to application of the image recognition algorithm to the input image.

FIG. 2A shows an example of plural image recognition dictionaries and plural image recognition techniques. More specifically, in FIG. 2A, the plural image recognition dictionaries include different image recognition dictionaries a, b, c . . . predefined for respective assumed environmental conditions different from each other in brightness and sharpness of a target object (person) image according to external environments and operating states of the subject vehicle. The plural image recognition techniques include different recognition algorithms $\alpha$, $\beta$ . . . and image correction.

In the present embodiment, as shown in FIG. 2B, plural image recognition methods (patterns A, B, C . . . ) are pre-stored in the storage 11, each representing a combination of one of the image recognition dictionaries and one of the image recognition techniques used to apply the image recognition processing to the input image. These image recognition methods are designed so as to provide optimal detection performance in various assumed environmental conditions, taking into account the environmental conditions used to predefine the respective image recognition dictionaries and the recognition properties of the respective image recognition algorithms for differences in brightness and sharpness of the target object image.

For example, an image recognition method applied in rainy weather may be a combination of an image recognition dictionary predefined for an assumed environmental condition that it is raining and an image recognition algorithm that can provide optimal detection performance in an environmental condition that it is raining. The image recognition methods for external environments other than the rainy weather may be predefined. The external environments other than the rainy weather include, but are not limited to, foggy weather, cloudy weather, sunny weather, fine weather after heavy rain, rainy weather after sunshine, day, evening, night, a well-lit area, a dark area, an urban area, a suburban area, a mountain area.

By way of example, when the headlights are off (or on), an image recognition method may be used that is a combination of an image recognition dictionary predefined for the assumed environmental condition that the headlights are off (on) and an image recognition algorithm that can provide optimal performance in such an assumed environmental condition. Also, when the wiper is off (or on), an image recognition method may be used that is a combination of an image recognition dictionary predefined for the assumed environmental condition that the wiper is off (or on) and an image recognition algorithm that can provide optimal performance in such an assumed environmental condition.

In addition, in conditions where the sharpness of the input image is significantly reduced, for example, in bad weather or when the wiper is operating quickly, the image correction may be applied to the input image, where the brightness, contrast, color, sharpness or the like of the input image are adjusted prior to application of the image recognition algorithms to the input image.

Referring back to FIG. 1A, the image input 2 includes, as an imaging unit, a vehicle-mounted camera or the like to capture an image forward of the subject vehicle. The captured image is fed from the image input 2 to the processor 10 of the object detection apparatus 1 an input image.

The external-environment and vehicle information input 3 feeds to the object detection apparatus 1 various information for determining the external environment around the subject vehicle and the operating states of the vehicle-mounted lighting devices (e.g., the headlights) and the windshield wiper. More specifically, to acquire information about the external environment around the subject vehicle, the external-environment and vehicle information input 3 may include a rain sensor, an illuminance sensor, a communication device that receives weather information and local information from external institutions, and/or an input device that inputs map information stored in a map database, or may be configured to determine the ambient brightness and/or surrounding background, and visibility and the like from the input image captured by the image input 2. To acquire information about the operating states of the subject vehicle, the external-environment and vehicle information input 3 may include a light switch which controls blinking of the lighting devices, and/or a wiper switch which operates the wiper.

The detection result output 4 alerts a driver of the subject vehicle of the presence of a vehicle or a person, and/or controls the subject vehicle, in response to a detection result from the object detection apparatus 1. The detection result output 4 includes, but is not limited to, a controller of a vehicle driving safety system or a driving aid system.

Figure 1B:
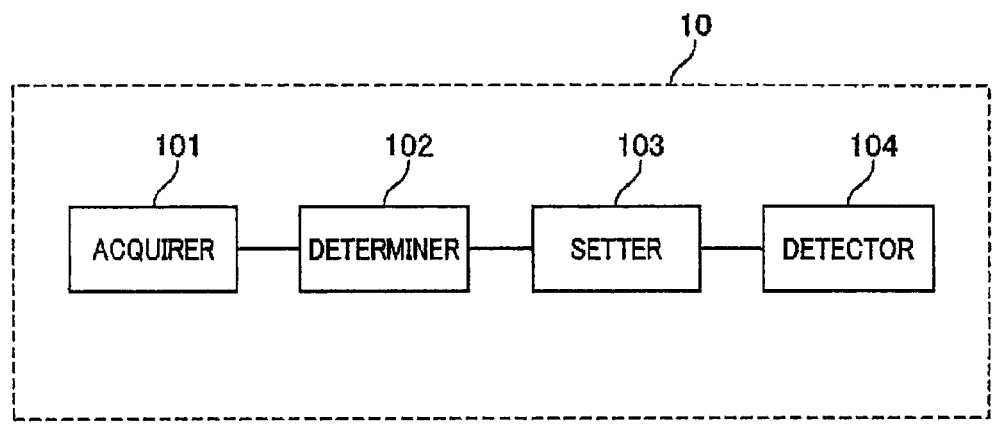
FIG. 1B shows a functional block diagram of a processor.

As shown in FIG. 1B, the processor 10 includes an acquirer 101, a determiner 102, a setter 103, and a detector 104. The acquirer 101 acquires either or both of information indicative of an external environment around the system and information indicative of an operating state of the system. The acquirer 101 is responsible for execution of step S100 of a target object detection process (described later). The determiner 102 determines an environmental condition with respect to the input image according to the information acquired from the acquirer 101. The determiner 102 is responsible for execution of step S102 of the target object detection process. The setter 103 sets, for each of plural image recognition methods predefined for respectively different assumed environmental conditions, a weighting factor according to the environmental condition determined by the determiner 102, where each image recognition method is a combination of one of the plural image recognition dictionaries and one of the plural image recognition techniques. The setter 103 is responsible for execution of step S104 of the target object detection process. The detector 104 detects the object in the input image by applying each of the plural image recognition methods to the input image to obtain image recognition results reflecting the weighting factors set by the setter 103 for the respective image recognition methods, and then collectively evaluating the image recognition results. The detector 104 is responsible for execution of step S106 of the target object detection process.

[Target Object Detection Process]

Figure 3:
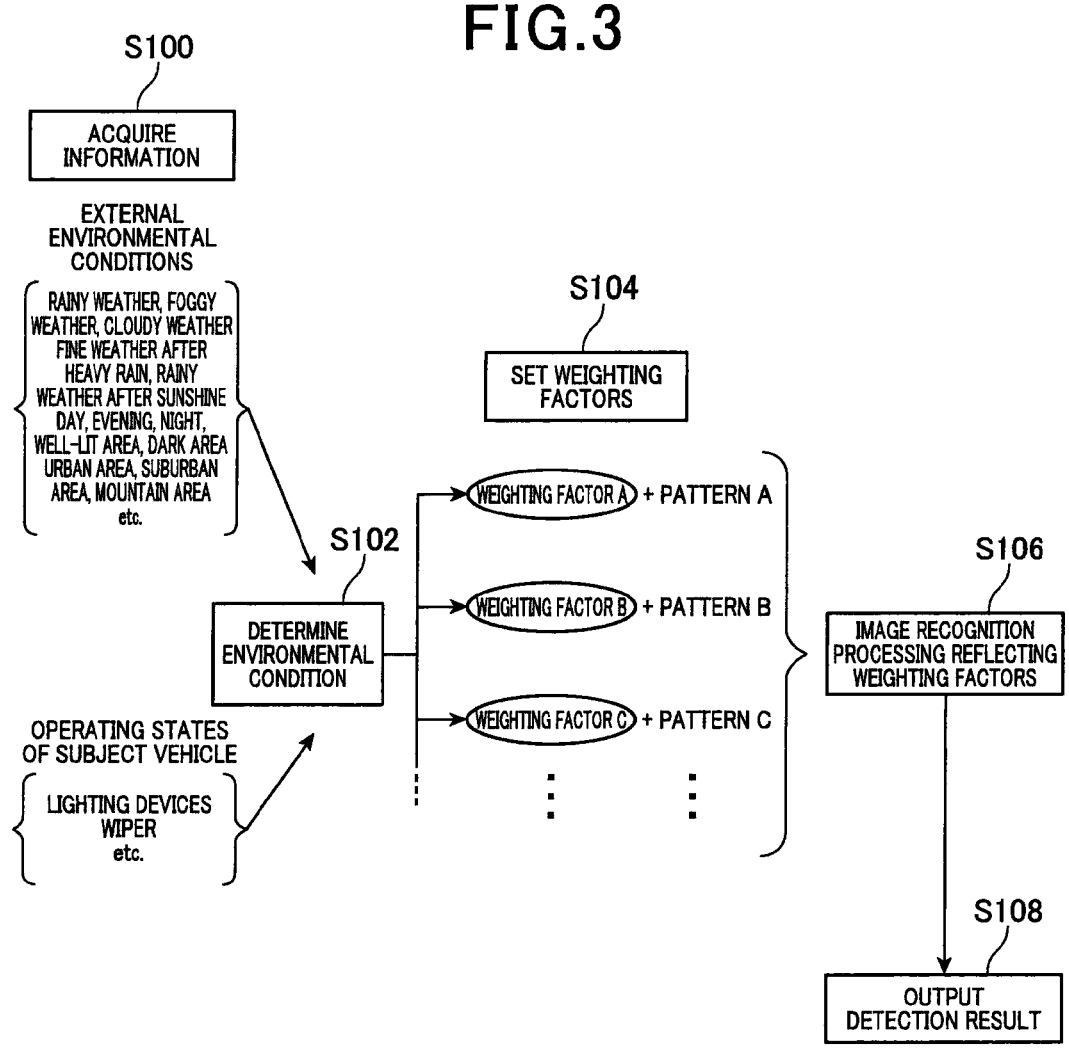
FIG. 3 shows an exemplary flowchart of a target object detection process.

A target object detection process performed in the processor 10 of the object detection apparatus 1 will now be explained with reference to a flowchart of FIG. 3.

In step S100, the processor 10 acquires, from the external-environment and vehicle information input 3, information indicative of an external environment around the subject vehicle and operating states of the vehicle lighting devices, the wiper and others. The external environments around the subject vehicle may include, but are not limited to, weather conditions (e.g., rainy weather, foggy weather, cloudy weather, sunny weather, fine weather after heavy rain, rainy weather after sunshine, etc.), times of day or day part (e.g., day, evening, night, etc.), ambient brightness, and backdrop attributes (e.g., an urban area, a suburban area, a mountain area, etc.), and others. The operating states of the lighting devices may include on, off, a low beam mode, a high beam mode, and the like of the headlights. The operating states of the wiper may include on, off, an operating speed, an operating interval, and the like.

In step S102, the processor 10 determines an environmental condition for the input image on the basis of the information acquired in step S100. Thereafter, in step S104, the processor 10 sets a weighting factor for each of the plural image recognition methods associated with the respective assumed environmental conditions on the basis of the environmental condition determined in step S102.

More specifically, the weighting factors for the respective image recognition methods are set as follows. A weighting factor table (see FIG. 3) is stored in the storage 11, which lists the weighting factors for the respective image recognition methods (patterns A, B, C . . . ) associated with the respective assumed environmental conditions. In such a table, for example, the weighting factor assigned to the image recognition method predefined for the assumed environmental condition identical or similar to the environmental condition determined in step S102 is set relatively greater than the weighting factors assigned to the image recognition methods predefined for the assumed environmental conditions less similar to the environmental condition determined in step S102. Conversely, the weighting factors assigned to the image recognition methods predefined for the assumed environmental conditions different from the environmental condition determined in step S102 are set relatively less than the weighting factor assigned to the image recognition method predefined for the assumed environmental condition identical or more similar to the environmental condition determined in step S102. Each of the plural image recognition methods is assigned a weighting factor associated with the current environmental condition determined in step S102 with reference to the weighting factor table stored in the storage 11.

In step S106, the processor 10 applies the image recognition processing to the input image received from the image input 2 with use of each of the plural image recognition methods assigned their respective weighting factors set in step S104, thereby detecting the target object in the input image. More specifically, the processor 10 scans, for each of the plural image recognition methods, the input image with use of the image recognition dictionary of the image recognition method and applies the image recognition processing to each of predefined areas in the input image according to the image recognition algorithm of the image recognition method, thereby calculating scores for the respective image recognition methods. When the image correction is included in the image recognition method, the input image is corrected prior to application of the image recognition algorithm of the image recognition method. It should be noted that the scores calculated for the respective image recognition methods reflect the weighting factors set for the respective image recognition methods.

For each of the plural image recognition methods, a provisional score is calculated as an image recognition result with use of the image recognition method, and then the provisional score is weighted by the weighting factor for the image recognition method, which provides a final score for the image recognition method. Alternatively, for each of the plural image recognition methods, features of the target object described in the image recognition dictionary associated with the image recognition method may be weighted by the weighting factor for the image recognition method, which leads to modified or corrected parameters of the image recognition dictionary for the image recognition method. A final score for the image recognition method is obtained by applying the image recognition processing with use of the modified image recognition dictionary and the image recognition algorithm for the image recognition method to the input image.

The final result is given by collectively evaluating the scores for the respective image recognition methods reflecting their weighting factors. Subsequently, in step S108, the processor 10 outputs the final result (as a detection result) to the detection result output 4.

[Benefits]

The object detection apparatus 1 of the present embodiment can provide the following benefits.

In the image recognition processing of the present embodiment with use of the plural image recognition methods each defined by a combination of one of the plural image recognition dictionaries and one of the plural image recognition techniques, the weighting factors for the respective image recognition methods are changed with various environmental conditions determined by the external environments and operating state of the subject vehicle, which leads to an increased contribution of the image recognition method that can provide optimal detection performance for the current environmental condition to the final result obtained by collectively evaluating the scores for the respective image recognition methods, and thus leads to an increased recognition rate for the target object. This can achieve higher robustness of the image recognition for various changing environmental conditions around or ambient to the target object, and can achieve higher performance of detecting the target object.

[Modifications]

In the above embodiment, the object detection apparatus is configured such that plural selectable image recognition dictionaries and plural selectable image recognition techniques are prestored in the apparatus. Alternatively, the object detection apparatus may be configured such that plural selectable image recognition dictionaries and a single fixed used image recognition technique are prestored in the apparatus, or may be configured such that a single fixed image recognition dictionary and plural selectable image recognition techniques are prestored in the apparatus.

In the above embodiment, the environmental conditions are determined by the external environments and the operating states of the subject vehicle. Alternatively, the environmental conditions may be determined by either the external environments or the operating states of the subject vehicle.

In the above embodiment, the object detection apparatus is mounted in the specific kind of vehicle, that is, an automobile. Alternatively, the object detection apparatus may be mounted in various systems. For example, the object detection apparatus may be mounted in another kind of vehicle, such as an aircraft, a ship, a railway vehicle or the like, or may be mounted in a security device, a home appliance or the like installed in a building or the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An object detection apparatus mounted in a system, the apparatus comprising:
   a storage storing plural image recognition dictionaries each describing reference data for an object to be detected and plural image recognition techniques each used to detect the object from an input image captured by an imaging unit with use of one of the plural image recognition dictionaries;
   an acquirer configured to acquire either or both of information indicative of an external environment around the system and information indicative of an operating state of the system;
   a determiner configured to determine an environmental condition with respect to the input image according to the information acquired from the acquirer;
   a setter configured to set, for each of plural image recognition methods predefined for respectively different assumed environmental conditions, a weighting factor according to the environmental condition determined by the determiner, each image recognition method being a combination of one of the plural image recognition dictionaries and one of the plural image recognition techniques; and
   a detector configured to detect the object in the input image by applying each of the plural image recognition methods to the input image to obtain image recognition results reflecting the weighting factors set by the setter for the respective image recognition methods, and then collectively evaluating the image recognition results.

2. The apparatus of claim 1, wherein the setter is configured to set, for each of the plural image recognition methods, a weighting factor as a function of a similarity between the environmental condition determined by the determiner and the assumed environmental condition corresponding the image recognition method.

3. The apparatus of claim 1, wherein each of the plural image recognition techniques comprises an image recognition algorithm to be applied to the input image with use of the image recognition dictionary of the image recognition method corresponding to the image recognition technique.

4. The apparatus of claim 3, wherein at least one of the plural image recognition techniques further comprises image correction applied to the input image prior to application of the corresponding image recognition algorithm to the input image.

5. The apparatus of claim 1, wherein
   the system is a vehicle,
   the information indicative of an external environment around the system includes at least one of weather conditions, times of day, ambient brightness, and backdrop attributes, and
   the information indicative of an operating state of the system includes at least one of operating states of lighting devices of the vehicle and operating states of a wiper of the vehicle.

6. An object detection apparatus mounted in a system, the apparatus comprising:
   a storage storing plural image recognition dictionaries each describing reference data for an object to be detected, and a single image recognition technique used to detect the object from an input image captured by an imaging unit with use of one of the plural image recognition dictionaries;
   an acquirer configured to acquire either or both of information indicative of an external environment around the system and information indicative of an operating state of the system;
   a determiner configured to determine an environmental condition with respect to the input image according to the information acquired from the acquirer;
   a setter configured to set, for each of plural image recognition methods predefined for respectively different assumed environmental conditions, a weighting factor according to the environmental condition determined by the determiner, each image recognition method being a combination of one of the plural image recognition dictionaries and the single image recognition technique; and
   a detector configured to detect the object in the input image by applying each of the plural image recognition methods to the input image to obtain image recognition results reflecting the weighting factors set by the setter for the respective image recognition methods, and then collectively evaluating the image recognition results.

7. The apparatus of claim 6, wherein the setter is configured to set, for each of the plural image recognition methods, a weighting factor as a function of a similarity between the environmental condition determined by the determiner and the assumed environmental condition corresponding the image recognition method.

8. The apparatus of claim 6, wherein the single image recognition technique comprises an image recognition algorithm to be applied to the input image with use of one of the image recognition dictionaries.

9. The apparatus of claim 8, wherein the single image recognition technique further comprises image correction applied to the input image prior to application of the image recognition algorithm to the input image.

10. The apparatus of claim 6, wherein
the system is a vehicle,
the information indicative of an external environment around the system includes at least one of weather conditions, times of day, ambient brightness, and backdrop attributes, and
the information indicative of an operating state of the system includes at least one of operating states of lighting devices of the vehicle and operating states of a wiper of the vehicle.

* * * * *